United States Patent

Hollyday, Jr.

[15] 3,661,541
[45] May 9, 1972

[54] FUEL OIL COMPOSITIONS CONTAINING A MIXTURE OF POLYMERS TO IMPROVE THE POUR POINT AND FLOW PROPERTIES

[72] Inventor: William C. Hollyday, Jr., Watchung, N.J.
[73] Assignee: Esso Research and Engineering Company
[22] Filed: Apr. 22, 1969
[21] Appl. No.: 818,427

[52] U.S. Cl. ............................................44/62, 44/66, 44/70
[51] Int. Cl. ...........................................C10l 1/16, C10l 1/18
[58] Field of Search ....................44/62, 70, 80, 66; 252/56 R

[56] References Cited

UNITED STATES PATENTS

| | | | |
|---|---|---|---|
| 3,254,063 | 5/1966 | Ilnyckyj | 44/62 X |
| 2,379,728 | 7/1945 | Lieber et al. | 44/62 X |
| 2,615,845 | 10/1952 | Lippincott et al. | 44/62 X |
| 3,126,364 | 3/1964 | Ilnyckyj | 44/62 X |
| 3,250,599 | 5/1966 | Kirk et al. | 44/62 |

FOREIGN PATENTS OR APPLICATIONS 993,744   6/1965   Great Britain ............................44/62

*Primary Examiner*—Daniel E. Wyman
*Assistant Examiner*—W. J. Shine
*Attorney*—Pearlman and Stahl and Roy J. Ott

[57] ABSTRACT

Mixtures containing (1) polymers of ethylene with polar monomers such as vinyl acetate, methyl methacrylate, ethyl fumarate, etc., and (2) homopolymers of ethylene or copolymers of ethylene with $C_3 - C_{18}$ alpha-olefins synergistically improve the pour point and flow characteristics of middle distillate petroleum oils.

9 Claims, No Drawings

FUEL OIL COMPOSITIONS CONTAINING A MIXTURE OF POLYMERS TO IMPROVE THE POUR POINT AND FLOW PROPERTIES

BACKGROUND OF THE INVENTION

1. Field of the Invention

The present invention relates to petroleum distillate oils containing a combination of polymeric additives which synergistically improve the pour point and flow characteristics of the oil. More particularly, the invention is concerned with middle distillate fuel oils containing (1) polymers of ethylene with vinyl esters of saturated monocarboxylic acids and/or alkyl esters of ethylenically unsaturated mono or dicarboxylic acids and (2) low molecular weight hydrocarbon polymers selected from the group consisting of homopolymers of ethylene, copolymers of ethylene with $C_3 - C_{18}$ alpha-olefins and combinations thereof.

2. Description of the Prior Art

Mineral oils containing paraffin wax therein have the characteristics of becoming less fluid as the temperature of the oil decreases. This loss of fluidity is due to the crystallization of the combined wax into needle-like crystals which eventually form a spongy mass entrapping the oil therein.

It has long been known that various compositions act as wax crystal modifiers when blended with waxy mineral oils. These compositions modify the size and shape of wax crystals in such a manner as to permit the oil to remain fluid at a lower temperature. They are known to the art as "pour point depressors" or "pour depressants" in that they lower the limiting temperature at which the oil maintains its free flow characteristics.

Various pour point depressants have been described in the literature and many of these are in commercial use. For example, U.S. Pat. No. 3,048,479 teaches the use of copolymers of ethylene and $C_3 - C_5$ vinyl esters, e.g., vinyl acetate, as pour depressants for fuels, specifically heating oils, diesel and jet fuels. Similarly, U.S. Pat. Nos. 3,087,894; 3,093,623; 3,131,168 and 3,250,714 disclose hydrocarbon oils containing as a pour depressant an ethylene-vinyl acetate copolymer essentially of the same type described in said U.S. Pat. No. 3,048,479.

Hydrocarbon polymeric pour depressants based on ethylene and higher alpha-olefins are also well known in the art. For example, British Pat. No. 993,744 teaches the use of copolymers of ethylene with $C_3 - C_6$ olefins as flow improvers for distillate fuel oils. Similarly, British Pat. No. 1,068,000 discloses that the pour point of furnace oils may be improved by incorporating therein a copolymer of ethylene and propylene.

While these ethylene-ester copolymers and ethylene-alpha-olefin copolymers per se are known in the art, it has not heretofore been known that mixtures of these two types of polymers exhibit an enhanced coaction in middle distillate mineral oils containing paraffin wax.

SUMMARY OF THE INVENTION

It has now been found, in accordance with this invention, that by incorporating in a mineral distillate oil, as flow improvers, the combination of (1) a polymer of ethylene with a vinyl ester of a $C_2 - C_5$ monocarboxylic acid and/or a $C_1 - C_{16}$ alkyl ester of an ethylenically unsaturated mono or dicarboxylic acid and (2) a hydrocarbon polymer selected from the group consisting of homopolymers of ethylene, copolymers of ethylene with $C_3 - C_{18}$ alpha-olefin, and combinations thereof, a synergistic improvement in the flow properties of the oil over that provided by the incorporation of either of these two types of polymers alone is obtained.

The ethylene-vinyl ester polymers used in the synergistic mixture of the invention contain about 3 to 40, preferably 4.6 to 18, molar proportions of ethylene per molar proportion of a vinyl alcohol ester of a $C_2 - C_5$ monocarboxylic acid. These polymers are generally well known in the art, being described in U.S. Pat. Nos. 3,048,479; 3,087,894; 3,093,623 and 3,250,714, which patents are incorporated herein in their entirety by express reference thereto. Specific examples of these vinyl esters include vinyl acetate, vinyl propionate, vinyl isobutyrate, etc. The preferred vinyl ester is vinyl acetate.

The polymers prepared from ethylene and aliphatic esters of ethylenically unsaturated monocarboxylic acids will contain about 3 to 40, preferably 4.5 to 20, molar proportions of ethylene per molar amount of an ethylenically unsaturated ester having the general formula:

wherein X is a hydrogen atom or a lower alkyl group of 1 to 7 carbons, e.g., methyl, ethyl, propyl, etc. and Y is:

wherein R is a $C_1$ to $C_{16}$, preferably $C_1$ to $C_{14}$ straight or branched chain alkyl group. Of these the acrylates and methacrylates are preferred. Such esters include methyl acrylate, methyl methacrylate, ethyl acrylate, ethyl methacrylate, isopropyl acrylate, isobutyl acrylate, $C_8$ Oxo acrylate, isobutyl methacrylate, lauryl acrylate, $C_{13}$ Oxo methacrylate and the like. A further description of these polymers prepared from ethylene and the aforedescribed ester monomers may be found in U.S. Pat. No. 3,126,364 and Canadian Pat. No. 676,875, which patents are incorporated herein in their entirety by express reference.

Component (1) of the synergistic mixture of the invention also includes those polymers comprised of 3 to 40, preferably 4.5 to 20, molar proportions of ethylene per molar proportion of a $C_1 - C_{16}$ mono or diester having the general formula:

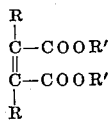

wherein each R is hydrogen or methyl, and wherein R' is hydrogen or a $C_1 - C_{16}$ straight or branched chain alkyl group. Anhydrides of the corresponding acids may also be employed. It is preferred, however, to use the diesters of fumaric and maleic acid. Examples of such materials include both cis and trans compounds such as maleic anhydride; dimethyl maleate; diethyl fumarate; methyl, ethyl fumarate; diisopropyl fumarate, di-(n-pentyl) fumarate; di-($C_8$ Oxo) fumarate; dilauryl maleate; the mono methyl ester of fumaric acid, i.e., one R' is hydrogen and the other is methyl; the mono n-octyl ester of maleic acid; etc.

The Oxo alcohols mentioned above are isomeric mixtures of branched chain aliphatic primary alcohols prepared from olefins, such as polymers and copolymers of $C_3$ to $C_4$ monoolefins, reacted with CO and hydrogen in the presence of cobalt-containing catalyst such as cobalt carbonyl, at temperatures of about 300° to 400° F., under pressures of about 1000 to 3000 psi., to form aldehydes. The resulting aldehyde product is then hydrogenated to form the Oxo alcohol which is then recovered by distillation from the hydrogenated product.

The aforedescribed ethylene-ester polymers which form component (1) of the synergistic mixture of this invention are prepared in accordance with well-known techniques. For example, polymerization of the ethylene and vinyl ester can be carried out as follows: Solvent and a portion of the vinyl ester, e.g., 0–50 weight percent, preferably 10 to 30 weight percent, of the total amount of unsaturated ester used in the batch, are charged to a stainless steel pressure vessel which is equipped with a stirrer. The temperature of the pressure vessel is then brought to the desired reaction temperature, e.g., 70° – 200°

C., and pressured to the desired pressure, 500 – 10,000 psig., with ethylene. Then catalyst, preferably dissolved in solvent so that it can be pumped, and additional amounts of unsaturated ester are added to the vessel continuously, or at least periodically, during the reaction time, e.g., 1–5 hours, which continuous addition gives a more homogeneous copolymer as compared to adding all the unsaturated ester at the beginning of the reaction. Also during this reaction time, as ethylene is consumed in the polymerization reaction, additional ethylene is supplied through a pressure controlling regulator so as to maintain the desired reaction pressure fairly constant at all times. Following the completion of the reaction, the liquid phase of the pressure vessel is distilled to remove the solvent and other volatile constituents of the reacted mixture, leaving the polymer as residue.

Usually, based upon 100 parts by weight of the ester copolymer to be produced, about 100 to 600 parts by weight of solvent, and about 1 to 20 parts by weight of a free radical initiator will be used to catalyze the reaction.

The solvent can be any non-reactive organic solvent for furnishing a liquid phase reaction which will not poison the catalyst or otherwise interfere with the reaction, and preferably is a hydrocarbon solvent such as benzene and hexane.

Free radical initiators that can be used include acyl peroxides of $C_2$ to $C_{18}$, branched or unbranched, carboxylic acids such as: di-acetyl peroxide, di-propionyl peroxide, di-pelargonyl peroxide, di-lauroyl peroxide, etc. The lower acyl peroxides such as di-acetyl and di-propionyl peroxide are less preferred because they are shock sensitive. Other free radical initiators that can be used include di-tert. butyl peroxide, benzoyl peroxide, various azo initiators such as azodiisobutyronitrile and azobis 2-methylvaleronitrile, etc.

The ethylene-alkyl ester polymers of this invention are prepared in a manner similar to the ethylene-vinyl ester copolymerization described above. Additional preparation methods are adequately described in the literature and may be found, for example, in U.S. Pat. Nos. 2,327,705; 3,048,479; 3,087,894; 3,093,623; 3,126,364; 3,165,485 and Canadian Pat. No. 676,875.

Component (2) of the synergistic mixture of this invention is a hydrocarbon polymer which is a homopolymer of ethylene or a polymer comprised of about 55 to 100 mole percent ethylene and 0 to 45 mole percent of $C_3$ to $C_{18}$ alpha-monoolefin (including mixtures thereof) having the general formula: $H_2C = CHR$ wherein R is a linear or branched alkyl group containing 1 to 16 carbon atoms. Specific examples of these alpha-monoolefins include propylene, isobutene, n-octene-1, isooctene-1, n-decene-1, dodecene-1, and the like. The preferred hydrocarbon copolymer is a copolymer containing 74 to 95 mole percent ethylene and 5 to 26 mole percent propylene. Homopolymers of ethylene when prepared by free radical catalysis are also preferred. A further description of these hydrocarbon polymers is given in British Pat. Nos. 993,744 and 1,068,000, which patents are incorporated herein in their entirety by express reference.

The hydrocarbon polymers of the synergistic mixture of the invention are conventionally prepared by homopolymerizing ethylene or by polymerizing ethylene with a $C_3 - C_{18}$ alpha-olefin or a mixture of said alpha-olefins in the presence of a conventional Ziegler-type catalyst or a free radical catalyst such as those described above. Methods for polymerizing these olefin monomers are adequately described in the literature, e.g., British Pat. Nos. 993,744 and 1,068,000.

The polymers of the synergistic mixture (i.e., component 1 and component 2) will have number average molecular weights in the range of about 850 to 50,000, preferably about 1,250 to 7,500, as measured by Vapor Phase Osmometry (VPO).

The synergistic composition of the invention comprises from about 1 to about 99 percent by weight of the aforedescribed ethylene-ester polymer and from about 99 to about 1 percent by weight of the aforedescribed hydrocarbon polymer. Preferred proportions are admixtures comprising from about 25 to about 75 weight percent of the ethylene-ester polymer and from about 25 to about 75 weight percent of the hydrocarbon polymer. Usually the synergistic mixture will be used as a 50/50 weight percent composition of the two types of polymers.

The synergistic mixture of the invention will generally be added to hydrocarbon oils in amounts of 0.005 to 2.0 weight percent, preferably 0.01 to 0.2 weight percent, said weight percent being based upon the weight of the oil to be treated.

For ease in handling, the synergistic mixture of the invention may be utilized in a concentrated form. For example, to facilitate storage and transportation, the aforedescribed synergistic mixture may be blended with a hydrocarbon solvent, e.g., a mineral oil, hexane, toluene, etc., to form a concentrate comprising from about 20 to about 80 weight percent hydrocarbon solvent, preferably 40–60 weight percent, and from about 20 to about 80 weight percent of the synergistic mixture, preferably 40–60 weight percent.

The hydrocarbon oils, which are blended with the synergistic mixture of this invention, include distillate fuel oils such as cracked or virgin or mixtures thereof, middle distillate fuels boiling in the range of 250° to 750° F., such as heating oil, diesel fuel oil, etc.

The synergistic composition of the invention is found to be compatible with other additive materials and may be blended successfully with distillate oils containing minor amounts of viscosity index improvers, other pour depressants, rust inhibitors, antioxidants, sludge inhibitors, sludge dispersants, etc.

The invention will be further understood by reference to the following examples which include preferred embodiments of the invention.

EXAMPLE 1

The synergistic improvements obtained by adding the aforedescribed components (1) and (2) in accordance with the present invention are illustrated in two different middle distillate heating oils which are known to be relatively non-responsive or poorly responsive to the addition of pour depressing and flow improving additives. These oils are hereinafter called Oil A and Oil B and their physical properties are set out below in Table I.

TABLE I

| Properties of Oil | Oil A | Oil B |
|---|---|---|
| Cloud Point, °F. | 24 | 20 |
| Pour Point, °F. | 20 | 15 |
| Density at 25°C., g./ml. | 0.8622 | 0.8484 |
| API Gravity | 31.2 | 33.6 |
| Viscosity, cs. at 100°F. | 3.40 | 2.60 |
| Aniline Point, °F. | 135 | 142 |
| | | |
| Distillation Data | | |
| Initial B.P., °F. | 370 | 298 |
| °F. at 5% Over | 415 | 352 |
| °F. at 50% Over | 531 | 540 |
| °F. at 95% Over | 632 | 644 |
| Final B.P., °F. | 644 | 656 |
| % Distilled | 99.0 | 98.5 |
| | | |
| Composition, Volume % | | |
| Straight Run Stocks | 20 | 30 |
| Cracked Stocks | 80 | 70 |

In this Example, oil Compositions containing components (1) and (2) of the synergistic mixture of this invention were tested in a Fluidity Test which involves placing a 40 milliliter sample of the oil composition to be tested into an hour-glass shaped device having upper and lower sections which are transparent plastic cylinders having an inner diameter of 3.8 centimeters and being connected by a brass capillary having a length of 12.5 millimeters and an inner diameter of 2.25 millimeters. The lower section is covered by a thin aluminum disc. The oil in the tester is placed in a cold box and is cooled from a point 10° F. above the cloud point to 10° F. below the cloud point at a rate of 4° F./hr. The tester is inverted and allowed to settle for 1 minute. Then the aluminum disc is punctured so that the oil flows from the upper chamber through the capillary tube into the lower chamber. A pass is considered when 90 percent or more volume of the oil flows from the upper chamber to the lower chamber in a time of 3 minutes or less. The test results are reported as "Percent Fluid" which designates the percent of the test composition which has flowed into the lower chamber in a time of 3 minutes. In this connection, it has been found that a percent fluid value of 90 percent or more will perform well under winter field conditions, while those with 48 to 75 percent fluid would give line-plugging under the same conditions.

Table II which follows summarizes the Fluidity Test results for Oil A containing synergistic mixtures of the invention.

TABLE II

Fluidity of Synergistic Mixtures in Oil A

| Amount of Additive in Oil, Wt. % | Additive Ethylene-Vinyl Acetate Copolymer[1]/Ethylene Propylene Copolymer[2] Weight Ratio | Fluidity Test Results, % Fluid |
|---|---|---|
| 0.056 | 1.00/0.00 | 50 |
| 0.056 | .585/.415 | 98 |
| 0.056 | 0.00/1.00 | 70 |
| 0.075 | 1.00/0.00 | 60 |
| 0.075 | 0.50/0.50 | 95 |
| 0.075 | 0.00/1.00 | 75 |
| 0.100 | 1.00/0.00 | 62 |
| 0.100 | 0.75/0.25 | 98 |
| 0.100 | 0.50/0.50 | 98 |
| 0.100 | 0.00/1.00 | 90 |
| | Ethylene-Isobutyl Acrylate Copolymer[3] /Ethylene-Propylene Copolymer[2] Weight Ratio | |
| 0.06 | 1.00/0.00 | 48 |
| 0.06 | 0.50/0.50 | 84 |
| 0.06 | 0.00/1.00 | 70 |
| 0.075 | 1.00/0.00 | 81 |
| 0.075 | 0.50/0.50 | 91 |
| 0.075 | 0.00/1.00 | 75 |

[1]Copolymer containing 69 wt. % ethylene and 31 wt. % vinyl acetate, having a number average molecular weight (VPO) of 2,605 and prepared in accordance with the method of U.S. Patent 3,048,479.
[2]Copolymer containing 89 wt. % ethylene and 11 wt. % propylene, having a number average molecular weight (VPO) of 1,495 and prepared in accordance with the method of British Patent 993,744.
[3]Copolymer containing 61 wt. % ethylene and 39 wt. % isobutyl acrylate, having a number average molecular weight (VPO) of 3,368 and prepared in accordance with the method of U.S. Patent 3,048,479.

As shown by Table II, the combination of the polymeric additive components of this invention imparts a marked improvement over that which could be obtained by the use of an equivalent amount of either material alone.

EXAMPLE 2

The ability of the polymeric components of this invention to synergistically improve the flow characteristics of middle distillate oils was further demonstrated in a Flow and Plugging Test. In this test, a 3,500 milliliter sample of the oil to be tested is placed in a 1 gallon can and cooled to a temperature 5° below the cloud point of the base fuel over 8 hours and maintained at this temperature for 7 hours. The cooled sample is then drawn under vacuum through a length of copper tubing having a conical inlet. The conical inlet serves as a wax packing device which increases the severity of the test as far as plugging the line is concerned. The flow rate through the copper tubing is a measure of the effect of the viscosity of the fuel, and, thus, an indication of its flow behavior.

In this test, the copper tubing which was inserted in the cooled fuel sample measured 150 centimeters in length with an outside diameter of 4.8 millimeters and a wall thickness of 0.8 millimeters and was fitted with an inlet machined from a 1 inch brass cube to a right angle cone 1 inch in diameter at the base and having at the top where it joins the copper tubing an orifice of one-sixteenth inch in diameter and one sixteenth long. The fuel was drawn into and through this line under 5 inches of mercury vacuum, and measured in a suitable receiver.

A pass is 90 percent or more of the sample flowing with a drop in the vacuum at the end of the test (signifying no wax plug in the line). If a plug occurs at the inlet, it is released by increasing the vacuum momentarily or with a wire. A borderline result is at least 90 percent over with one wax plug at the end or during the test. A failure is less than 90 percent over, or two wax plugs. The results for Test Oil B containing the ethylene-vinyl acetate copolymer of Example 1, the ethylene-propylene copolymer of Example 2 and a 50/50 mixture thereof are given in the following Table.

TABLE III

Evaluation of Additive Mixtures in Flow and Plugging Tests

| Additive blended with oil B | Plugging tendency | % Fluid in test | Flow rate ml./min. | Test rating |
|---|---|---|---|---|
| 0.06 Wt. % Ethylene-Vinyl Acetate Copolymer of Example 1 | Yes | 2 | – | Fail |
| 0.06 Wt. % Ethylene-Propylene Copolymer of Example 1 | No | 91 | 99 | Pass |
| 0.06 Wt. % of 50/50 Mixture of Ethylene-Vinyl Acetate Copolymer and Ethylene-Propylene Copolymer | No | 92 | 137 | Pass |

From the data in Table III, the synergistic effect provided by the combination of the ethylene-vinyl acetate copolymers and ethylene-propylene copolymers is evident. Thus, the combination of the additive components of this invention impart an improvement in flow characteristics which is greater than that which could be obtained by the use of an equivalent amount of either material alone.

It is not intended that this invention be limited to the specific examples presented by way of illustration. The scope of the invention is limited only by the appended claims.

What is claimed is:

1 An oil composition comprising a major proportion of a petroleum distillate fuel boiling in the range of 250° to 750° F. and about 0.005 to 2.0 weight percent of a synergistic mixture containing (a) 1–99 parts by weight of an oil-soluble polymer comprised of about 3 to 40 molar proportions of ethylene per molar proportion of a compound selected from the group consisting of a vinyl alcohol ester of a $C_2$ to $C_5$ monocarboxylic acid; an ethylenically unsaturated ester having the formula:

wherein each X is a hydrogen atom or a lower alkyl group and Y is:

wherein each R is a $C_1$ to $C_{18}$ alkyl group; and (b) 1–99 parts by weight of an oil-soluble polymer comprised of about 74 to 95 mole percent ethylene and 5 to 26 mole percent of $C_3$ to $C_{18}$ alpha-monoolefin; said polymers having number average molecular weights ranging up to about 850 to 50,000.

2. An oil according to claim 1, wherein said component (a) is a polymer comprised of ethylene and vinyl acetate.

3. An oil according to claim 1, wherein said component (a) is a polymer comprised of ethylene and an ethylenically unsaturated ester having the formula:

wherein X is a hydrogen atom or methyl and Y is:

wherein R is a $C_1$ to $C_{14}$ alkyl group.

4. An oil according to claim 2 wherein said component (b) is a copolymer of ethylene and propylene.

5. An oil according to claim 2 wherein said component (b) is a copolymer of about 74 to 95 mole percent ethylene and about 5 to 26 mole percent propylene and said oil-soluble polymers have number average molecular weights within the range between about 1,250 and 7,500.

6. A composition according to claim 2 wherein said ethylenically unsaturated ester component is isobutylacrylate.

7. An oil composition comprising a major proportion of a petroleum distillate fuel boiling in the range of 250° to 750° F. and about 0.005 to 2.0 weight percent of a synergistic mixture containing (a) an oil-soluble polymer comprised of about 4.6 to 18 molar proportions of ethylene per molar proportion of vinyl acetate; and (b) an oil-soluble polymer comprised of about 74 to 95 mole percent ethylene and about 5 to 26 mole percent of propylene; said polymers having number average molecular weights within the range between about 1250 and 7500.

8. A concentrate comprising from about 20 to about 80 wt. % of a hydrocarbon solvent and from about 20 to about 80 wt. % of the synergistic mixture defined by claim 1.

9. A concentrate comprising from about 20 to about 80 weight percent of a hydrocarbon solvent and from about 20 to about 80 weight percent of the synergistic mixture defined by claim 2.

* * * * *